(12) United States Patent
Jeon et al.

(10) Patent No.: US 7,326,364 B2
(45) Date of Patent: Feb. 5, 2008

(54) COMPLEX LIGHT-COMPENSATION C PLATE WITH TWO OR MORE OF C PLATES DIFFERENT IN DISPERSION RATIO VALUE AND LIQUID CRYSTAL DISPLAY USING THE SAME

(75) Inventors: Byoung Kun Jeon, Daejeon (KR); Sergey Belyaev, Daejeon (KR); Jeong Su Yu, Daejeon (KR); Nikolay Malimonenko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 483 days.

(21) Appl. No.: 10/917,364

(22) Filed: Aug. 13, 2004

(65) Prior Publication Data
US 2005/0057714 A1 Mar. 17, 2005

(30) Foreign Application Priority Data
Aug. 14, 2003 (KR) .................. 10-2003-0056391

(51) Int. Cl.
*C09K 19/52* (2006.01)
*G02F 1/1335* (2006.01)

(52) U.S. Cl. .............. 252/299.01; 349/121; 349/113; 349/14

(58) Field of Classification Search .......... 349/14, 349/113, 121; 252/299.01
See application file for complete search history.

(56) References Cited

U.S. PATENT DOCUMENTS

| | | | |
|---|---|---|---|
| 4,889,412 A | 12/1989 | Clerc et al. | |
| 6,072,553 A * | 6/2000 | Mitsui et al. | 349/113 |
| 6,356,325 B1 | 3/2002 | Shimoshikiryo | |
| 6,400,433 B1 | 6/2002 | Arakawa et al. | |
| 2002/0060762 A1 | 5/2002 | Arakawa | |
| 2006/0055836 A1* | 3/2006 | Lee et al. | 349/14 |

FOREIGN PATENT DOCUMENTS

| | | |
|---|---|---|
| EP | 0864906 A1 | 9/1998 |
| JP | 4-116603 A | 4/1992 |
| JP | 4-121703 A | 4/1992 |
| JP | 2-609139 B2 | 8/1994 |
| JP | 6-230368 A | 8/1994 |
| JP | 2001-042127 A | 2/2001 |
| JP | 2002-090530 A | 3/2002 |
| WO | WO-01/20392 A1 | 3/2001 |

OTHER PUBLICATIONS

Ono Y et al.: "Wavelength Dispersion Effects of Retardation Films on VA-LCDs" IDW. Proceedings of the International Display Workshops, XX, XX, 2002, pp. 525-528.

* cited by examiner

*Primary Examiner*—Geraldina Visconti
(74) *Attorney, Agent, or Firm*—Birch, Stewart, Kolasch & Birch, LLP

(57) ABSTRACT

Disclosed is a complex light compensation C plate including at least two C plates representing different dispersion ratio values, respectively. The complex light compensation C plate improves a contrast characteristic of a liquid crystal display device at various viewing angles and has a broadband wavelength dispersion characteristic capable of minimizing color variation depending on various viewing angles in a black state of an LCD.

14 Claims, 7 Drawing Sheets

+C-plate ($n_z > n_x = n_y$)

-C-plate ($n_z < n_x = n_y$)

COMPLEX LIGHT-COMPENSATION C PLATE WITH TWO OR MORE OF C PLATES DIFFERENT IN DISPERSION RATIO VALUE AND LIQUID CRYSTAL DISPLAY USING THE SAME

This Non-provisional application claims priority under 35 U.S.C. § 119(a) on Patent Application No(s). 10-2003-0056391 filed in Korea, Republic of on Aug. 14, 2003, the entire contents of which are hereby incorporated by reference.

TECHNICAL FIELD

The present invention relates to a viewing angle compensation film for an LCD, and more particularly to a viewing angle compensation film for an LCD such as a VA-LCD (vertically aligned liquid crystal display, see U.S. Pat. No. 4,889,412) filled with liquid crystal having negative dielectric anisotropy ($\Delta\epsilon<0$), an IPS-LCD (in-plane switching liquid crystal display) and a TN-LCD (twisted nematic liquid crystal display), capable of achieving a superior contrast characteristic at various viewing angles, and capable of minimizing color variation depending on various viewing angles in a black state.

BACKGROUND ART

Generally, liquid crystal has a birefringence characteristic, that is, a refractive index of light in a longitudinal axis direction of molecules of the liquid crystal is different from a refractive index of light in a transverse axis direction of molecules of the liquid crystal. Due to such a birefringence characteristic of the liquid crystal, persons may feel different refractive indexes of light depending on their positions with respect to an LCD. Accordingly, when linearly polarized light passes through the liquid crystal, a polarizing state of the light is changed with various ratios, so an amount of light and the color characteristic perceived by the persons may vary depending on positions of the persons with respect to the LCD. Therefore, a liquid crystal display device having a twisted nematic structure may represent various contrast ratios, color shifts, and a gray inversion phenomenon according to viewing angles.

In order to compensate for a phase difference created in a liquid crystal cell, a TN LCD technique using a phase difference compensation film has been developed. According to the TN LCD technique, the phase difference of light created in the liquid crystal cell is compensated for by means of the phase difference compensation film, so that the above-mentioned problems derived from the viewing angles can be solved. However, a TN LCD using a negative phase difference compensation film can improve a gray characteristic only when a viewing angle forms an angle of 45° with respect to a transmission axis of a polarizing plate, while representing uneven image quality and a halftone gray inversion phenomenon. Meanwhile, a VATN-LCD (vertically aligned TN-LCD) using liquid crystal having a negative dielectric anisotropy property has been developed. The VATN-LCD can be fabricated with low costs and simple processes as compared with the TN-LCD, while representing a superior contrast ratio, low threshold voltage and fast response time.

In a case of the TN-LCD, if voltage is not applied to the liquid crystal, a longitudinal axis of liquid crystal molecules is spirally twisted in parallel to a substrate. In this state, if voltage is applied to the liquid crystal, the longitudinal axis of liquid crystal molecules is aligned vertically to the substrate. In contrast, at an initial stage of the VATN-LCD, liquid crystal molecules of the VATN-LCD are aligned similar to an alignment of the liquid crystal molecules of the TN-LCD to which voltage has been applied. In this state, if voltage is applied to the liquid crystal of the VATN-LCD, liquid crystal molecules of the VATN-LCD are twisted.

In an off-state of the VATN-LCD, liquid crystal molecules are vertically aligned and retardation of light does not occur if a viewing angle matches with an alignment direction of the liquid crystal molecules. Therefore, a superior contrast ratio may be achieved at the above viewing angle. However, if the viewing angle does not match with the alignment direction of the liquid crystal molecules, retardation of light may occur due to the birefringence of the liquid crystal, causing inferior contrast ratio. In particular, the contrast ratio is extremely lowered when the viewing angle forms an angle of 45° with respect to a transmission axis of a polarizing plate.

Liquid crystal having vertically aligned molecules has a characteristic identical to that of a C plate having a positive birefringence. Accordingly, the above birefringence of the liquid crystal can be compensated for by means of a compensation film made from a C plate having a negative birefringence. Preferably, an optimum retardation value of the compensation film made from C plate is substantially identical to a retardation value created due to the birefringence of the liquid crystal cell.

U.S. Pat. No. 4,889,412 discloses a technique regarding a negative (−) C plate. A main function of the negative C plate is to compensate for a black state of a VA-LCD at a no-voltage state or a low-voltage state. However, a conventional negative C plate represents a limited phase difference wavelength dispersion ratio value $$\left(\frac{R_{450}}{R_{550}}\right)$$

so that the conventional negative C plate cannot properly compensate for the black state and color variation of RGB at various viewing angles.

For instance, a wavelength dispersion ratio value of an LCD panel has a normal wavelength dispersion characteristic, and a C plate having a super-high wavelength dispersion characteristic is required in order to compensate for the black state and color variation of RGB created in the LCD panel. However, it is difficult to achieve such a super-high wavelength dispersion characteristic by using one conventional phase difference film.

In the black state, the VA-LCD represents characteristics identical to those of a positive (+) C plate. In order to completely compensate for the positive C plate by using the negative C plate, the negative and positive C plates must have the same wavelength dispersion characteristic. Liquid crystal used for an LCD has a normal wavelength dispersion characteristic, and the wavelength dispersion ratio value $$\left(\frac{R_{450}}{R_{550}}\right)$$

thereof is large. Thus, it is difficult to fabricate a phase difference film adaptable for the wavelength dispersion characteristic of liquid crystal of the VA-LCD by using the conventional negative C plate having the limited phase difference wavelength dispersion ratio value.

The positive C plate has been used for minimizing color variation of a CLC polarizing plate (for a brightness enhancement) at various viewing angles. However, the positive C plate also has a limited phase difference wavelength dispersion ratio value $$\left(\frac{R_{450}}{R_{550}}\right),$$

so the positive C plate represents problems identical to those of the negative C plate.

For instance, the positive C plate must have a super-high wavelength dispersion characteristic in order to minimize color variation of the CLC polarizing plate, but the conventional C plate phase difference film cannot provide the positive C plate having the super-high wavelength dispersion characteristic.

In a case of the CLC polarizing plate, it is necessary to provide the positive C plate representing the wavelength dispersion characteristic identical to that of the CLC. However, since the wavelength dispersion ratio value of the CLC is very large, it is difficult to fabricate the phase difference film adaptable for the wavelength dispersion characteristic of the CLC by using the conventional positive C plate.

DISCLOSURE OF THE INVENTION

Therefore, in order to completely compensate for variation of a phase difference value in a cell of an LCD, it is necessary to provide a C plate having broadband wavelength dispersion characteristics including a super-high wavelength dispersion characteristic, an inverse wavelength dispersion characteristic, an intermediate wavelength dispersion characteristic, and a mixed wavelength dispersion characteristic.

The present invention is based on the findings that in case of using a complex light-compensation C plate including at least two C plates representing different dispersion ratio values, phase difference values, that is, retardation values of the C plates in the thickness direction can be summed up at the same wavelengths and then differently from the conventional C plate consisting of only one sheet of C plate with the limited phase difference dispersion ratio value $$\left(\frac{R_{450}}{R_{550}}\right),$$

it is possible to provide the complex light-compensation C plate having broadband wavelength dispersion characteristics.

Accordingly, an object of the present invention is to provide a design condition and a fabricating method for a complex light-compensation C plate having broadband wavelength dispersion characteristics.

In order to accomplish the above objects, there is provided a complex light compensation C plate comprising at least two C plates representing different dispersion ratio values, respectively.

In detail, the present invention provides the complex light compensation C plate consisting of an m-number of positive C plates and an n-number of negative C plates, wherein dispersion ratio values $$\left(\frac{R_{450}}{R_{550}}\right)$$

of at least two C plates are different from each other. Herein, m=0 or a positive integer, n=0 or a positive integer, m+n≧2; R=($n_z-n_y$)×d representing a phase difference value in a thickness direction, $n_x$ and $n_y$ are surface refractive indexes of a film, $n_z$ is a refractive index in a thickness direction of a film, d is a thickness of a film; $R_{450C}$ is a phase difference value of a C plate at a wavelength of 450 nm, and $R_{550C}$ is a phase difference value of a C plate at a wavelength of 550 nm.

In this case, when the m-number of positive C plates are stacked together with the n-number of negative C plates, regardless of the stacking order thereof, the total phase different value ($R_{tot}$) of the stacked C plates can be achieved by adding a value R obtained by summing up the phase difference values of the m-number of positive C plates to a value R' obtained by summing up the phase difference values of the n-number of negative C plates. That is, $R_{tot}$=R+R'. Herein, the R has a positive value and the R' has a negative value.

BEST MODE FOR CARRYING OUT THE INVENTION

Reference will now be made in detail to the preferred embodiments of the present invention.

Hereinafter, a preferred embodiment of the present invention will be described with reference to accompanying drawings.

Figure 2:
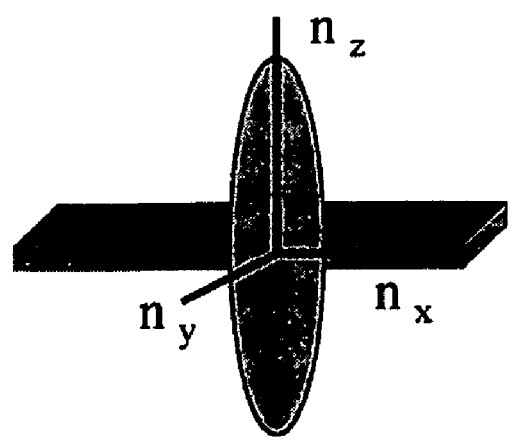
FIG. 2 is a view showing a refractive index of a positive C plate.
Figure 3:
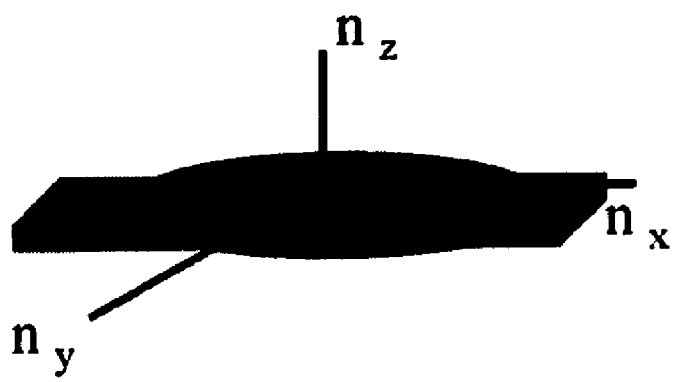
FIG. 3 is a view showing a refractive index of a negative C plate.

FIGS. 2 and 3 show refractive indexes of a positive (+) C plate and a negative (−) C plate, respectively. The C plate signifies a phase difference film having a phase difference value in a thickness direction thereof. The phase difference value in a thickness direction of the phase difference film is defined as follows:

$$R = (n_z - n_y) \times d$$

R>0: positive C plate
R<0: negative C plate

Wherein, $n_y$ is a smallest refractive index value among surface refractive index values of a film, $n_z$ is a refractive index in a thickness direction of a film, and d is a thickness of a film.

The positive C plate can be made from polymer having a positive birefringence, biaxial stretched polymer or UV-curable nematic liquid crystal polymer. The negative C plate can be made from TAC (triacetate cellulose), a cyclo-olefin based copolymer film, a biaxial stretched polymer film, or a UV-curable short pitch cholesteric liquid crystal film.

The phase difference value as a function of the wavelength of the C plate is called "wavelength dispersion characteristic of a phase difference film" and is defined as follows:

$$R(\lambda) = d \times \Delta n(\lambda) = (d \times \Delta n(550 \text{ nm})) \left( A + \frac{B}{(\lambda - \lambda_1)^2} \right)$$

wherein, A and B represent a Cauchy coefficient determined according to materials and $\lambda_1$ represents an absorption wavelength.

Figure 4:
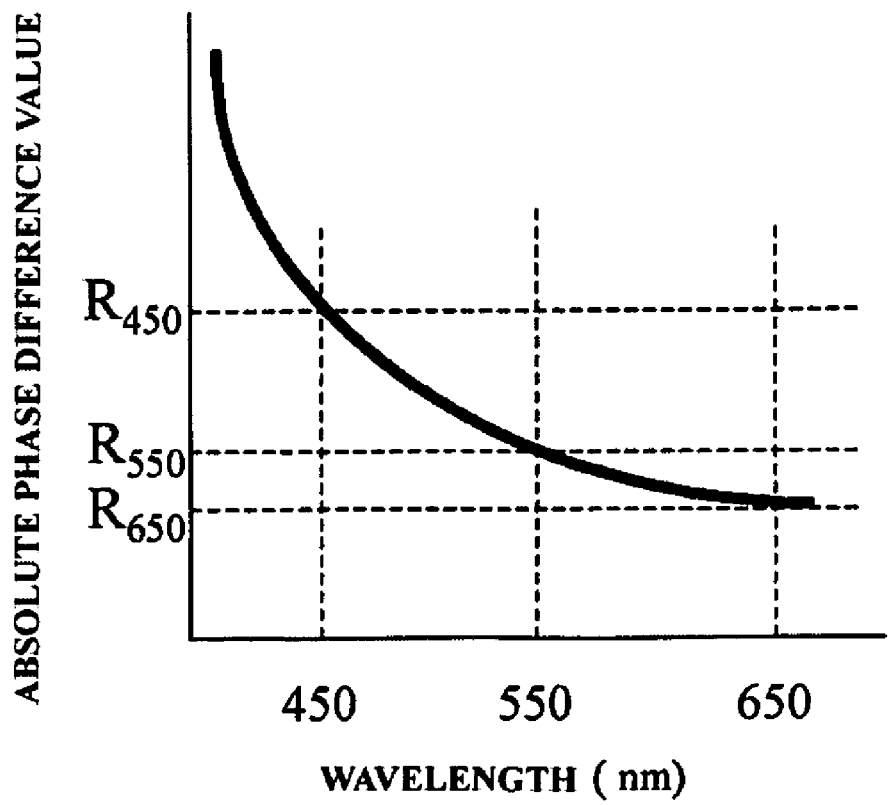
FIG. 4 is a view showing a wavelength dispersion characteristic (an absolute phase difference value in a thickness direction as a function of wavelengths) of a conventional C plate.

FIG. 4 is a view showing a phase difference absolute value in a thickness direction of conventional positive and negative C plates as a function of wavelengths. As shown in FIG. 4 as a graph, a film having a phase difference absolute value decreased as the wavelength is increased is called a phase difference film having a normal wavelength dispersion characteristic.

The dispersion characteristic $$\left( \frac{R_{450}}{R_{550}} \right)$$

of the C plate is a specific characteristic determined by a material of a film.

The wavelength dispersion characteristic of the C plate can be described by using dispersion ratio values in two wavelengths $$\left( \frac{R_{450}}{R_{550}}, \frac{R_{650}}{R_{550}} \right)$$

as parameters. Herein, $R_{450}, R_{550}, R_{650}$ represent phase difference values at wavelengths of 450 nm, 550 nm and 650 nm, respectively.

In a case of a general C plate, a phase difference ratio value in wavelengths of 450 nm and 550 nm is limited within a range of $$1 < \frac{R_{450}}{R_{550}} < 1.2$$

and a phase difference ratio value in wavelengths of 550 nm and 650 nm is limited within a range of $$0.9 < \frac{R_{650}}{R_{550}} < 1.$$

In a case of a transparent material, a great phase difference dispersion is represented in visible light area having a short wavelength because great light absorption may occur at the short wavelength. Thus, the wavelength dispersion ratio value at the short wavelength $$\left( \frac{R_{450}}{R_{550}} \right)$$

is larger than the wavelength dispersion ratio value at a long wavelength $$\left( \frac{R_{650}}{R_{550}} \right)$$

by two times. Due to the light absorption at the short wavelength as described above, the wavelength dispersion ratio value of the C plate is limited.

For instance, when the light absorption occurs at the short wavelength, a denominator value of a last term, which includes a coefficient B, in the Cauchy equation becomes reduced and variation of the phase difference value according to the wavelength becomes large, so a difference between the phase difference value at the short wavelength and the phase difference value at the long wavelength is more increased.

Because almost materials represent light absorption at a short wavelength area (UV area), materials have a normal wavelength dispersion ratio value. In order to represent a super-high wavelength dispersion characteristic, light absorption must be represented at a wavelength of 400 nm. However, if an absorption wavelength exists in visible light area, the material cannot be adaptable for the phase difference film. Accordingly, the wavelength dispersion ratio value is limited. In addition, it is also impossible to fabricate the phase difference film having an inverse wavelength dispersion characteristic, in which a phase difference value is increased as the wavelength in the visible light area becomes increased.

The limitation of the wavelength dispersion ratio value in the C plate can be solved by using two C plates (first C plate $C_1$ and second C plate $C_2$) representing different dispersion ratio values, respectively.

Accordingly, the present invention is characterized in adjusting the wavelength dispersion characteristic of the C plates to any level by using two C plates ($C_1$ and $C_2$) representing different dispersion ratio values.

According to a first embodiment of the present invention, there is provided a complex C plate having a broadband wavelength dispersion characteristic by consisting of two C plates ($C_1$ and $C_2$) satisfying the following equation.

$$\frac{(R_{450})_{C_1}}{(R_{550})_{C_1}} \neq \frac{(R_{450})_{C_2}}{(R_{550})_{C_2}}$$

wherein, $R=(n_z-n_y)\times d$ is a phase difference value in a thickness direction, $(R_{450})_{C_1}$ is a phase difference value of a C plate $C_1$ at 450 nm, $(R_{550})_{C_1}$ is a phase difference value of a C plate $C_1$ at 550 nm, $(R_{450})_{C_2}$ is a phase difference value of a C plate $C_2$ at 450 nm, and $(R_{550})_{C_2}$ is a phase difference value of a C plate $C_2$ at 550 nm. In addition, each film must satisfy the following equation:

$$n_z \neq n_x = n_y.$$

wherein, $n_x$ and $n_y$ represent a surface refractive index of a film, $n_z$ represents a refractive index in a thickness direction of a film, and d represents a thickness of a film.

According to a second embodiment of the present invention, there is provided a complex light compensation positive C plate having a super-high wavelength dispersion characteristic (the complex positive C plate having a large wavelength dispersion ratio $$\left(\frac{R_{450}}{R_{550}}\right)$$

value) by consisting of positive and negative C plates.

On the assumption that two films forming the complex light compensation positive C plate having a super-high wavelength dispersion characteristic are $C_1$ and $C_2$, in which $C_1$ is the positive C plate ($n_z>n_x=n_y$) and $C_2$ is the negative C plate ($n_z<n_x=n_y$), the complex light compensation positive C plate having two films stacked on each other must satisfy the following equations in order to achieve the super-high dispersion characteristic.

$$(R_{550})_{C_1} > |(R_{550})_{C_2}|$$

$$\frac{(R_{450})_{C_1}}{(R_{550})_{C_1}} > \frac{(R_{450})_{C_2}}{(R_{550})_{C_2}}$$

wherein, $(R_{450})_{C_1}$ represents a phase difference value of C plate $C_1$ in a thickness direction of a film at a wavelength of 450 nm, $(R_{550})_{C_1}$ represents a phase difference value of C plate $C_1$ in a thickness direction of a film at a wavelength of 550 nm, $(R_{450})_{C_2}$ represents a phase difference value of C plate $C_2$ in a thickness direction of a film at a wavelength of 450 nm, and $(R_{550})_{C_2}$ represents a phase difference value of C plate $C_2$ in a thickness direction of a film at a wavelength of 550 nm.

Figure 5:
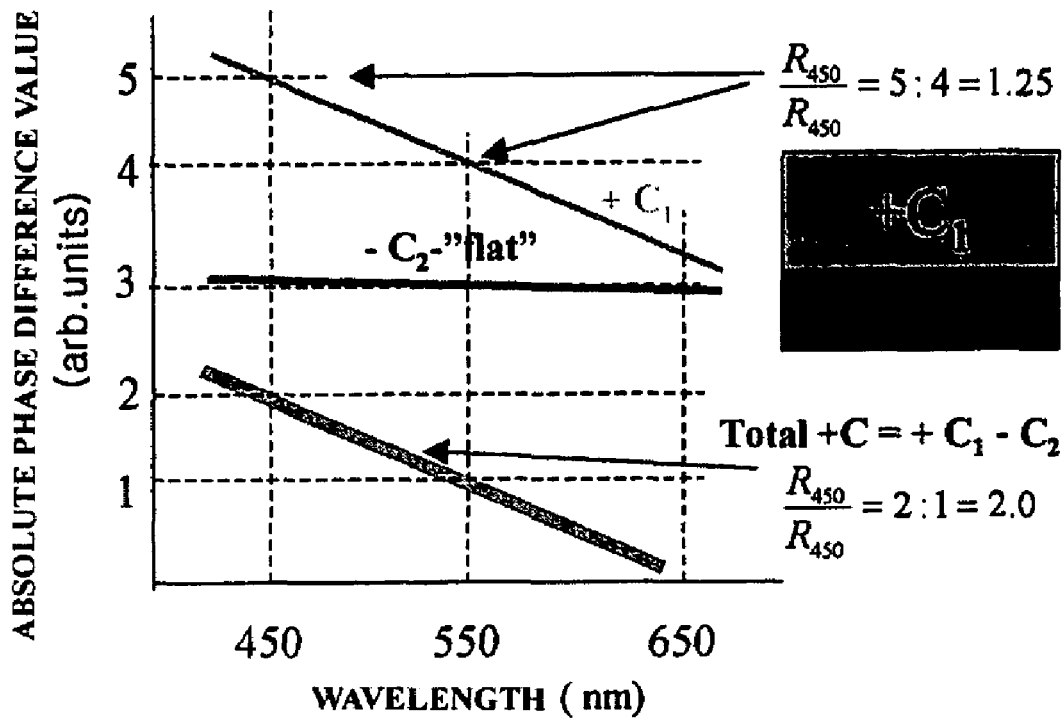
FIG. 5 is a view showing a super-high wavelength dispersion characteristic of a complex positive C plate consisting of a positive C plate and a negative C plate.

FIG. 5 is a view showing absolute phase difference values of a positive C plate $C_1$, a negative C plate $C_2$ and a complex positive C plate in the thickness direction as a function of wavelengths, respectively, in which the complex positive C plate has a super-high wavelength dispersion characteristic.

For instance, if the positive C plate $C_1$ has a phase difference value of 400 nm in the thickness direction thereof at the wavelength of 550 nm and a phase difference value of 500 nm in the thickness direction thereof at the wavelength of 450 nm, the dispersion ratio value of the positive C plate $C_1$ is represented as $$\frac{(R_{450})_{C_1}}{(R_{550})_{C_1}} = \frac{500 \text{ nm}}{400 \text{ nm}} = 1.25.$$

In addition, if the negative C plate $C_2$ has a phase difference value of −300 nm in the thickness direction thereof at the wavelength of 550 nm with a flat type wavelength dispersion characteristic representing almost similar phase difference values in the thickness direction of the negative C plate within a range of visible light, the dispersion ratio value of the negative C plate $C_2$ is represented as $$\frac{(R_{450})_{C_2}}{(R_{550})_{C_2}} = \frac{-300 \text{ nm}}{-300 \text{ nm}} = 1.$$

At this time, the complex C plate has a phase difference value of $(R_{550})$=400 nm−300 nm=100 nm at the wavelength of 550 nm, and a phase difference value of $(R_{450})$=500 nm−300 nm=200 nm at the wavelength of 450 nm. Therefore, the complex light compensation positive C plate is a positive C plate having a super-high dispersion ratio value of $$\frac{(R_{450})_C}{(R_{550})_C} = \frac{200 \text{ nm}}{100 \text{ nm}} = 2.$$

The positive C plate may perform a function of phase retardation and the negative C plate may perform a function of promoting the phase shift. Thus, when two phase difference films are stacked on each other, the phase difference values in the thickness direction of the complex positive C plate as a function of the wavelengths represent difference values between the absolute phase difference values of the positive C plate and the negative C plate at each wavelength (see, FIG. 5).

A value of $$\frac{R_{450}}{R_{550}}$$

for the complex light compensation positive C plate having a super-high wavelength dispersion characteristic can be identical to or more than 1.2, which can be achieved by using one film, that is, $$\left(\frac{R_{450}}{R_{550}}\right)_{C\_total} \geq 1.2.$$

The complex light compensation positive C plate having the super-high dispersion characteristic is adaptable for an IPS-LCD, and a brightness enhancement film, such as a CLC polarizing plate.

According to a third embodiment of the present invention, there is provided a complex light compensation negative C plate having a super-high wavelength dispersion characteristic (the complex negative C plate having a large wavelength dispersion ratio $$\left(\frac{R_{450}}{R_{550}}\right)$$

value) by consisting of positive and negative C plates.

On the assumption that two films forming the complex light compensation negative C plate having a super-high wavelength dispersion characteristic are $C_1$ and $C_2$, in which $C_1$ is the negative C plate ($n_z<n_x=n_y$) and $C_2$ is the positive C plate ($n_z>n_x=n_y$), the complex light compensation negative C plate having two films stacked on each other must satisfy the following equations in order to achieve the super-high dispersion characteristic.

$$|(R_{550})_{C_1}| > (R_{550})_{C_2}$$

$$\frac{(R_{450})_{C_1}}{(R_{550})_{C_1}} > \frac{(R_{450})_{C_2}}{(R_{550})_{C_2}}$$

wherein, $(R_{450})_{C_1}$ represents a phase difference value of C plate $C_1$ in a thickness direction of a film at a wavelength of 450 nm, $(R_{550})_{C_1}$ represents a phase difference value of C plate $C_1$ in a thickness direction of a film at a wavelength of 550 nm, $(R_{450})_{C_2}$ represents a phase difference value of C plate $C_2$ in a thickness direction of a film at a wavelength of 450 nm, and $(R_{550})_{C_2}$ represents a phase difference value of C plate $C_2$ in a thickness direction of a film at a wavelength of 550 nm.

Figure 6:
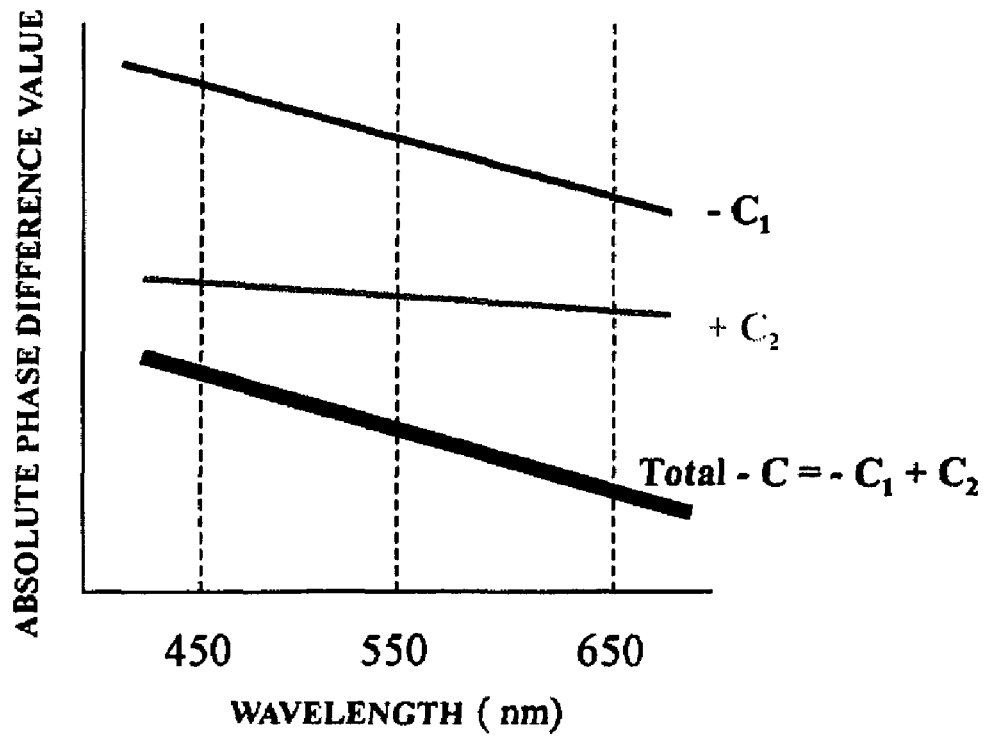
FIG. 6 is a view showing a super-high wavelength dispersion characteristic of a complex negative C plate consisting of a positive C plate and a negative C plate.

FIG. 6 is a view showing an absolute phase difference values of a negative C plate $C_1$, a positive C plate $C_2$ and a complex negative C plate in the thickness direction as a function of wavelengths, respectively, in which the complex negative C plate has a super-high wavelength dispersion characteristic.

For instance, if the negative C plate $C_1$ has a phase difference value of −400 nm in the thickness direction thereof at the wavelength of 550 nm and a phase difference value of −500 nm in the thickness direction thereof at the wavelength of 450 nm, the dispersion ratio value of the negative C plate $C_1$ is represented as $$\frac{(R_{450})_{C_1}}{(R_{550})_{C_1}} = \frac{-500 \text{ nm}}{-400 \text{ nm}} = 1.25.$$

In addition, if the positive C plate $C_2$ has a phase difference value of 300 nm in the thickness direction thereof at the wavelength of 550 nm with a flat type wavelength dispersion characteristic representing almost similar phase difference values in the thickness direction of the positive C plate within a range of visible light, the dispersion ratio value of the positive C plate $C_2$ is represented as $$\frac{(R_{450})_{C_2}}{(R_{550})_{C_2}} = \frac{300 \text{ nm}}{300 \text{ nm}} = 1.$$

At this time, the complex C plate has a phase difference value of $(R_{550})$=−400 nm+300 nm=−100 nm at the wavelength of 550 nm, and a phase difference value of $(R_{450})$=−500 nm+300 nm=−200 nm at the wavelength of 450 nm. Therefore, the complex light compensation negative C plate of the present invention is a negative C plate having a super-high dispersion ratio value of $$\frac{(R_{450})_C}{(R_{550})_C} = \frac{-200 \text{ nm}}{-100 \text{ nm}} = 2.$$

A value of $$\frac{R_{450}}{R_{550}}$$

for the complex light compensation negative C plate having a super-high wavelength dispersion characteristic can be identical to or more than 1.2, which can be achieved by using one film.

The complex light compensation negative C plate having the super-high dispersion characteristic is adaptable for an IPS-LCD, and a brightness enhancement film, such as a CLC polarizing plate.

Figure 1:
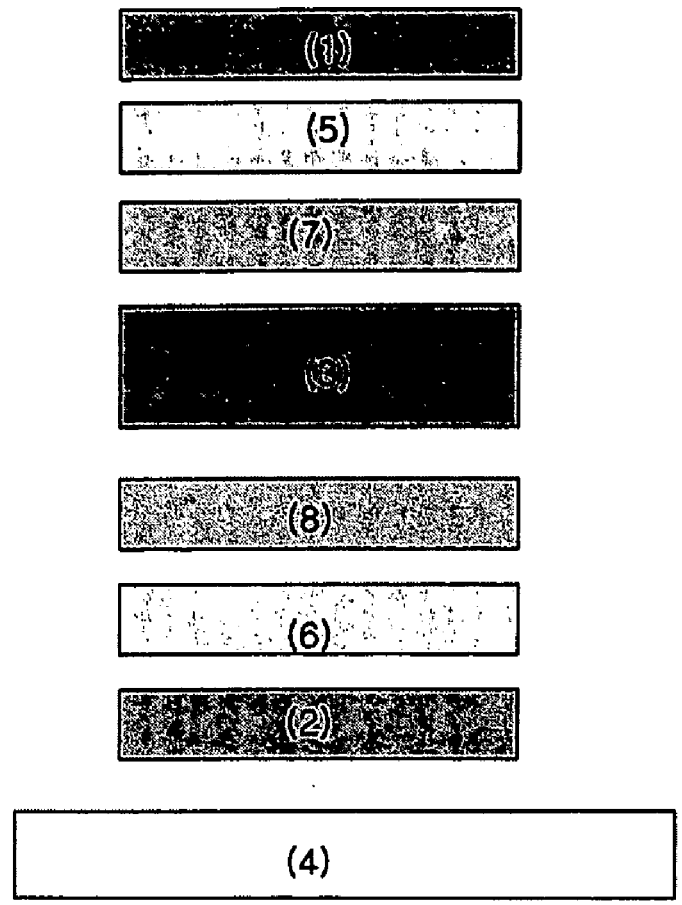
FIG. 1 is a schematic view showing an example of a position of a complex light compensation C plate of the present invention in a liquid crystal display device, in which reference numerals 1 to 4 represent an upper polarizing plate(1), a lower polarizing plate(2), an LCD panel(3), and a backlight(4), respectively, reference numerals 5 and 6 represent a uniaxial A plate or a biaxial A plate, and reference numerals 7 and 8 represent complex light compensation C plates, wherein the position of the A plates can be interchanged with the position of the complex light compensation C plates.

Meanwhile, the C plate having a low wavelength dispersion characteristic, a flat wavelength dispersion characteristic, or an inverse wavelength dispersion characteristic, depending on wavelength dispersion characteristic of the A plate shown in FIG. 1, can be combined with the A plate so as to be used as a viewing angle compensation film for an IPS-LCD.

According to a fourth embodiment of the present invention, there is provided a complex light compensation positive C plate having a low wavelength dispersion characteristic $$\left(1 < \left(\frac{R_{450}}{R_{550}}\right)_{C\_total} < 1.2\right),$$

a flat wavelength dispersion characteristic $$\left(\left(\frac{R_{450}}{R_{550}}\right)_{C\_total} = 1\right)$$

or an inverse wavelength dispersion characteristic $$\left(0 < \left(\frac{R_{450}}{R_{550}}\right)_{C\_total} < 1\right),$$

by consisting of positive and negative C plates.

On the assumption that two films forming the complex light compensation positive C plate having the low wavelength dispersion characteristic, the flat wavelength dispersion characteristic or the inverse wavelength dispersion characteristic are $C_1$ and $C_2$, in which $C_1$ is a positive C plate ($n_z > n_x = n_y$) and $C_2$ is a negative C plate ($n_z < n_x = n_y$), the complex light compensation positive C plate having two films stacked on each other must satisfy the following equations in order to achieve the low wavelength dispersion characteristic, the flat wavelength dispersion characteristic or the inverse wavelength dispersion characteristic.

$$(R_{550})_{C_1} > |(R_{550})_{C_2}|$$

$$\frac{(R_{450})_{C_1}}{(R_{550})_{C_1}} < \frac{(R_{450})_{C_2}}{(R_{550})_{C_2}}$$

wherein, $(R_{450})_{C_1}$ represents a phase difference value of C plate $C_1$ in a thickness direction of a film at a wavelength of 450 nm, $(R_{550})_{C_1}$ represents a phase difference value of C plate $C_1$ in a thickness direction of a film at a wavelength of 550 nm, $(R_{450})_{C_2}$ represents a phase difference value of C plate $C_2$ in a thickness direction of a film at a wavelength of 450 nm, and $(R_{550})_{C_2}$ represents a phase difference value of C plate $C_2$ in a thickness direction of a film at a wavelength of 550 nm.

Figure 7:
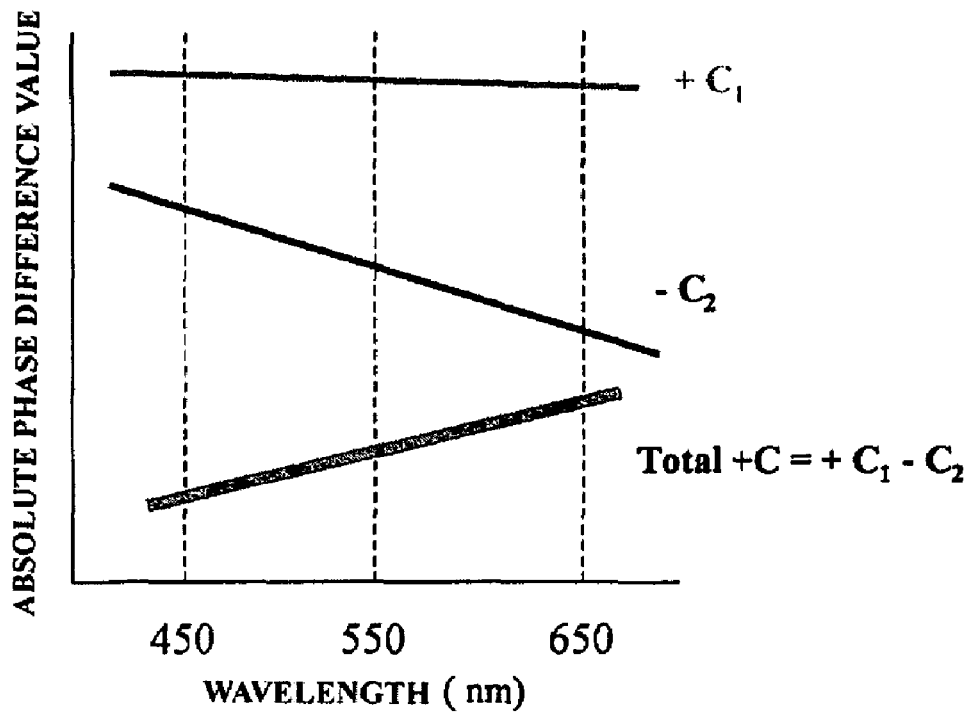
FIG. 7 is a view showing an inverse wavelength dispersion characteristic of a complex positive C plate consisting of a positive C plate and a negative C plate.

FIG. 7 is a view showing an absolute phase difference values of a positive C plate $C_1$, a negative C plate $C_2$ and a complex positive C plate in the thickness direction as a function of wavelengths, respectively, in which the complex positive C plate has an inverse wavelength dispersion characteristic.

For instance, if the positive C plate $C_1$ has a phase difference value of 500 nm in the thickness direction thereof at the wavelength of 550 nm with a flat type wavelength dispersion characteristic representing almost similar phase difference values in the thickness direction thereof within a range of visible light, a wavelength dispersion characteristic for the positive C plate $C_1$ is represented as $$\frac{(R_{450})_{C_1}}{(R_{550})_{C_1}} = \frac{500 \text{ nm}}{500 \text{ nm}} = 1.$$

In addition, if the negative C plate $C_2$ has a phase difference value of −350 nm in the thickness direction thereof at the wavelength of 550 nm, and a phase difference value of −400 nm in the thickness direction thereof at the wavelength of 450 nm, the dispersion ratio value of the negative C plate $C_2$ is represented as $$\frac{(R_{450})_{C_2}}{(R_{550})_{C_2}} = \frac{-400 \text{ nm}}{-350 \text{ nm}} = 1.14.$$

At this time, the complex C plate has a phase difference value of $(R_{550})$=500 nm−350 nm=150 nm at the wavelength of 550 nm, and a phase difference value of $(R_{450})$=500 nm−400 nm=100 nm at the wavelength of 450 nm. Therefore, the complex light compensation positive C plate is a positive C plate having an inverse dispersion characteristic of $$\left(\frac{(R_{450})_C}{(R_{550})_C} = \frac{100 \text{ nm}}{150 \text{ nm}} = 0.67 < 1\right).$$

A value of $$\frac{R_{450}}{R_{550}}$$

for the complex light compensation positive C plate having the inverse wavelength dispersion characteristic is $$0 < \frac{R_{450}}{R_{550}} < 1.$$

In addition, a value of $$\frac{R_{450}}{R_{550}}$$

for the complex light compensation positive C plate having the flat wavelength dispersion characteristic is 1.

The complex light compensation C plate can be combined with the A plate as shown in FIG. 1 so as to be used in an LCD. In addition, the complex light compensation C plate can be selected according to the wavelength dispersion characteristic of liquid crystal used in an LCD panel and the A plate. The complex light compensation C plate having the flat wavelength dispersion characteristic or the low wavelength dispersion characteristic may be used when the wavelength dispersion characteristics of the liquid crystal used in the LCD panel and the A plate represent the flat wavelength dispersion characteristic or the low wavelength dispersion characteristic. The complex light compensation C plate having the inverse wavelength dispersion characteristic may be used when the liquid crystal used in the LCD panel has a normal wavelength dispersion characteristic and the A plate has a normal wavelength dispersion characteristic.

According to a fifth embodiment of the present invention, there is provided a complex light compensation negative C plate having a low wavelength dispersion characteristic $$\left(1 < \left(\frac{R_{450}}{R_{550}}\right)_{C\_total} < 1.2\right),$$

a flat wavelength dispersion characteristic $$\left(\left(\frac{R_{450}}{R_{550}}\right)_{C\_total} = 1\right)$$

or an inverse wavelength dispersion characteristic $$\left(0 < \left(\frac{R_{450}}{R_{550}}\right)_{C\_total} < 1\right),$$

by consisting of positive and negative C plates.

On the assumption that two films forming the complex light compensation negative C plate having the low wavelength dispersion characteristic, the flat wavelength dispersion characteristic or the inverse wavelength dispersion characteristic are $C_1$ and $C_2$, in which $C_1$ is a negative C plate ($n_z < n_x = n_y$) and $C_2$ is a positive C plate ($n_z > n_x = n_y$), the complex light compensation negative C plate having two films stacked on each other must satisfy the following equations in order to achieve the low wavelength dispersion characteristic, the flat wavelength dispersion characteristic or the inverse wavelength dispersion characteristic.

$$|(R_{550})_{C_1}| > (R_{550})_{C_2}$$

$$\frac{(R_{450})_{C_1}}{(R_{550})_{C_1}} < \frac{(R_{450})_{C_2}}{(R_{550})_{C_2}}$$

wherein, $(R_{450})_{C_1}$ represents a phase difference value of C plate $C_1$ in a thickness direction of a film at a wavelength of 450 nm, $(R_{550})_{C_1}$ represents a phase difference value of C plate $C_1$ in a thickness direction of a film at a wavelength of 550 nm, $(R_{450})_{C_2}$ represents a phase difference value of C plate $C_2$ in a thickness direction of a film at a wavelength of 450 nm, and $(R_{550})_{C_2}$ represents a phase difference value of C plate $C_2$ in a thickness direction of a film at a wavelength of 550 nm.

Figure 8:
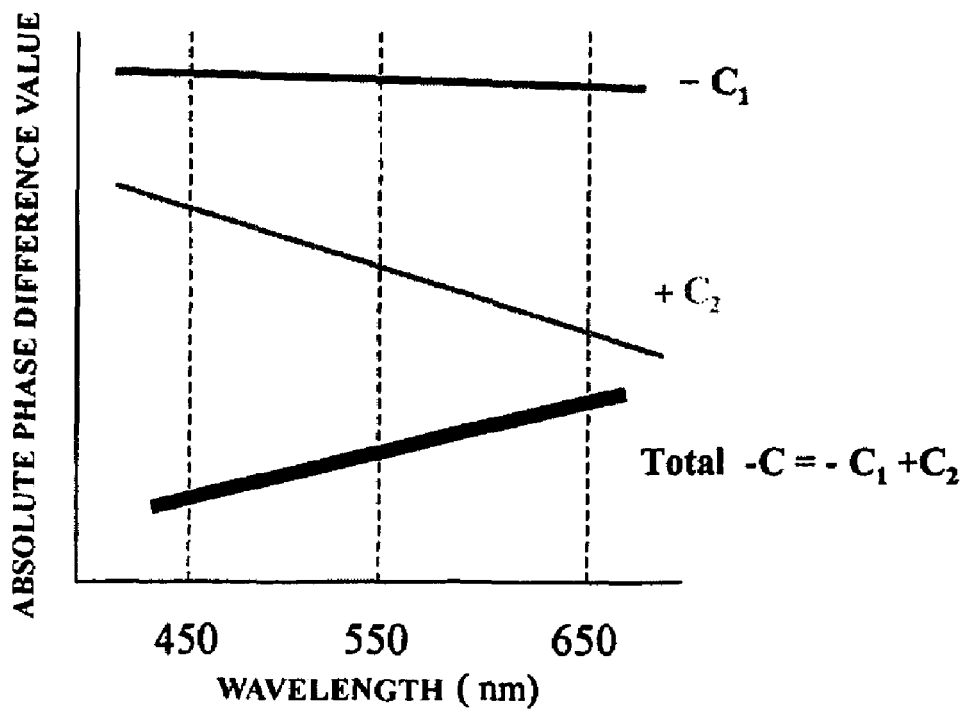
FIG. 8 is a view showing an inverse wavelength dispersion characteristic of a complex negative C plate consisting of a positive C plate and a negative C plate.

FIG. 8 is a view showing an absolute phase difference values of a negative C plate $C_1$, a positive C plate $C_2$ and a complex negative C plate in the thickness direction as a function of wavelengths, respectively, in which the complex negative C plate has an inverse wavelength dispersion characteristic $$\left(\frac{(R_{450})}{(R_{550})} < 1\right).$$

For instance, if the negative C plate $C_1$ has a phase difference value of −500 nm in the thickness direction thereof at the wavelength of 550 nm with a flat type wavelength dispersion characteristic representing almost similar phase difference values in the thickness direction thereof within a range of visible light, a wavelength dispersion ratio value for the negative C plate $C_1$ is represented as $$\frac{(R_{450})_{C_1}}{(R_{550})_{C_1}} = \frac{-500 \text{ nm}}{-500 \text{ nm}} = 1.$$

In addition, if the positive C plate $C_2$ has a phase difference value of 350 nm in the thickness direction thereof at the wavelength of 550 nm, and a phase difference value of 400 nm in the thickness direction thereof at the wavelength of 450 nm, the dispersion ratio value of the positive C plate $C_2$ is represented as $$\frac{(R_{450})_{C_2}}{(R_{550})_{C_2}} = \frac{400 \text{ nm}}{350 \text{ nm}} = 1.14.$$

At this time, the complex C plate has a phase difference value of $(R_{550})$=−500 nm+350 nm=−150 nm at the wavelength of 550 nm, and a phase difference value of $(R_{450})$=−500 nm+400 nm=−100 nm at the wavelength of 450 nm. Therefore, the complex light compensation negative C plate is a negative C plate having an inverse dispersion characteristic of $$\left(\frac{(R_{450})_C}{(R_{550})_C} = \frac{-100 \text{ nm}}{-150 \text{ nm}} = 0.67 < 1\right).$$

The complex light compensation C plate can be combined with the A plate shown in FIG. 1 so as to be used in an LCD. In addition, the complex light compensation negative C plate can be selected according to the wavelength dispersion characteristic of liquid crystal used in an LCD panel and the A plate. The complex light compensation negative C plate having the flat wavelength dispersion characteristic or the low wavelength dispersion characteristic may be used when the wavelength dispersion characteristics of the liquid crystal used in the LCD panel and the A plate represent the flat wavelength dispersion characteristic or the low wavelength dispersion characteristic. The complex light compensation negative C plate having the inverse wavelength dispersion characteristic may be used when the liquid crystal used in the LCD panel has a normal wavelength dispersion characteristic and the A plate has a normal wavelength dispersion characteristic.

According to a sixth embodiment of the present invention, there is provided a complex light compensation positive C plate having an intermediate wavelength dispersion characteristic by consisting of two positive C plates representing different wavelength dispersion characteristics.

Figure 9:
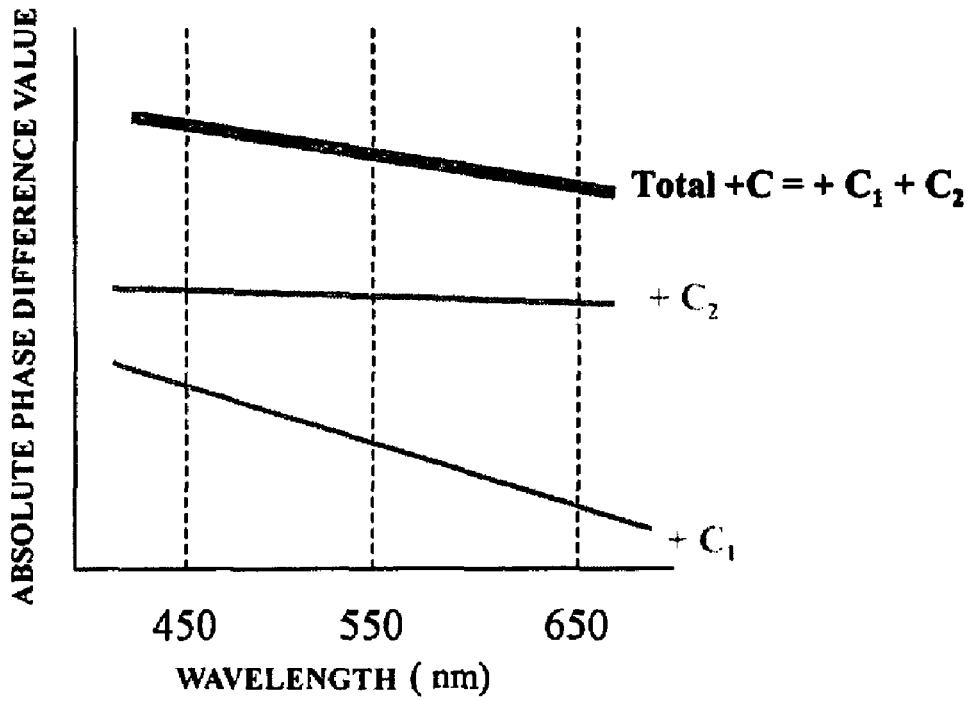
FIG. 9 is a view showing an intermediate wavelength dispersion characteristic of a complex positive C plate consisting of two positive C plates.

On the assumption that two films forming the complex light compensation positive C plate having the intermediate wavelength dispersion characteristic are $C_1$ and $C_2$, in which $C_1$ is a first positive C plate ($n_z > n_x = n_y$), $C_2$ is a second positive C plate ($n_z > n_x = n_y$), and $C_1$ and $C_2$ represent different wavelength dispersion characteristics, FIG. 9 shows an absolute phase difference values of two films and the complex positive C plate in the thickness direction as a function of wavelengths, respectively.

For instance, if the first positive C plate $C_1$ has a phase difference value of 200 nm in the thickness direction thereof at the wavelength of 550 nm and a phase difference value of 240 nm in the thickness direction thereof at the wavelength of 450 nm, the wavelength dispersion characteristic for the first positive C plate $C_1$ is represented as $$\frac{(R_{450})_{C_1}}{(R_{550})_{C_1}} = \frac{240 \text{ nm}}{200 \text{ nm}} = 1.2.$$

In addition, if the second positive C plate $C_2$ has a phase difference value of 300 nm in the thickness direction thereof at the wavelength of 550 nm and a phase difference value of 330 nm in the thickness direction thereof at the wavelength of 450 nm, the dispersion ratio value of the second positive C plate $C_2$ is represented as $$\frac{(R_{450})_{C_2}}{(R_{550})_{C_2}} = \frac{330 \text{ nm}}{300 \text{ nm}} = 1.1.$$

At this time, the complex light compensation C plate has a phase difference value of $(R_{550})$=200 nm+300 nm=500 nm at the wavelength of 550 nm, and a phase difference value of $(R_{450})$=240 nm+330 nm=570 nm at the wavelength of 450 nm. Therefore, the complex light compensation positive C plate according to the present invention is a positive C plate having an intermediate dispersion characteristic of $$\left(\frac{(R_{450})_C}{(R_{550})_C} = \frac{570 \text{ nm}}{500 \text{ nm}} = 1.14\right).$$

The complex light compensation positive C plate having the intermediate wavelength dispersion characteristic of two C plates may have a value of $$\frac{R_{450}}{R_{550}}$$

exceeding 1.

The complex light compensation positive C plate having the intermediate wavelength dispersion characteristic can be used for an IPS-LCD panel representing a low wavelength dispersion characteristic.

According to a seventh embodiment of the present invention, there is provided a complex light compensation negative C plate having an intermediate wavelength dispersion characteristic by consisting of two negative C plates representing different wavelength dispersion characteristics.

Figure 10:
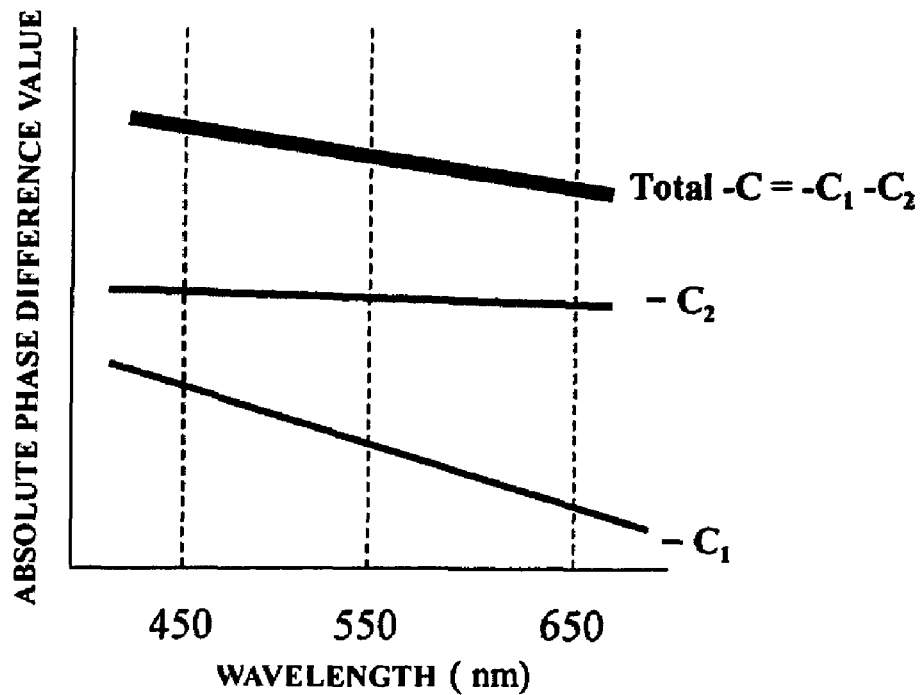
FIG. 10 is a view showing an intermediate wavelength dispersion characteristic of a complex negative C plate consisting of two negative C plates.

On the assumption that two films forming the complex light compensation negative C plate having the intermediate wavelength dispersion characteristic are $C_1$ and $C_2$, in which $C_1$ is a first negative C plate ($n_z<n_x=n_y$), $C_2$ is a second negative C plate ($n_z<n_x=n_y$), and $C_1$ and $C_2$ represent different wavelength dispersion characteristics, FIG. 10 shows an absolute phase difference values of two films and the complex negative C plate in the thickness direction as a function of wavelengths, respectively.

For instance, if the first negative C plate $C_1$ has a phase difference value of −200 nm in the thickness direction thereof at the wavelength of 550 nm and a phase difference value of −240 nm in the thickness direction thereof at the wavelength of 450 nm, the dispersion ratio value for the first positive C plate $C_1$ is represented as $$\frac{(R_{450})_{C_1}}{(R_{550})_{C_1}} = \frac{-240 \text{ nm}}{-200 \text{ nm}} = 1.2.$$

In addition, if the second negative C plate $C_2$ has a phase difference value of −300 nm in the thickness direction thereof at the wavelength of 550 nm and a phase difference value of −330 nm in the thickness direction thereof at the wavelength of 450 nm, the dispersion ratio value of the second positive C plate $C_2$ is represented as $$\frac{(R_{450})_{C_2}}{(R_{550})_{C_2}} = \frac{-330 \text{ nm}}{-300 \text{ nm}} = 1.1.$$

At this time, the complex light compensation C plate has a phase difference value of $(R_{550})$=−200 nm−300 nm=−500 nm at the wavelength of 550 nm, and a phase difference value of $(R_{450})$=−240 nm−330 nm=−570 nm at the wavelength of 450 nm. Therefore, the complex light compensation negative C plate according to the present invention is a negative C plate having an intermediate dispersion characteristic of $$\left(\frac{(R_{450})_C}{(R_{550})_C} = \frac{-570 \text{ nm}}{-500 \text{ nm}} = 1.14\right).$$

The complex light compensation negative C plate having the intermediate wavelength dispersion characteristic of two C plates may have a value of $$\frac{R_{450}}{R_{550}}$$

exceeding 1.

The complex light compensation negative C plate having the intermediate wavelength dispersion characteristic can be used for a VA-LCD panel representing a low wavelength dispersion characteristic.

According to an eighth embodiment of the present invention, there is provided a mixed light compensation C plate representing a mark inversion characteristic at a predetermined wavelength ($\lambda_0$), in which the mixed light compensation C plate becomes a positive C plate at a wavelength shorter than a predetermined wavelength $\lambda_0$, and becomes a negative C plate at a wavelength longer than the predetermined wavelength $\lambda_0$.

On the assumption that two films forming the mixed light compensation C plate having the mark inversion characteristic at a predetermined wavelength ($\lambda_0$) are $C_1$ and $C_2$, in which $C_1$ is a positive C plate ($n_z>n_x=n_y$) and $C_2$ is a negative C plate ($n_z<n_x=n_y$), the mixed light compensation C plate having two films stacked on each other must satisfy the following equations in order to achieve the above wavelength dispersion characteristic.

$$(R_{\lambda_0})_{C_1} = |(R_{\lambda_0})_{C_2}|$$

[If a wavelength satisfying the above equation are present in visible light range, 450<$\lambda_0$<650 can be achieved.]

$$\frac{(R_{450})_{C_1}}{(R_{550})_{C_1}} > \frac{(R_{450})_{C_2}}{(R_{550})_{C_2}}$$

wherein, $(R_{450})_{C_1}$ represents a phase difference value of C plate $C_1$ in a thickness direction of a film at a wavelength of 450 nm, $(R_{550})_{C_1}$ represents a phase difference value of C plate $C_1$ in a thickness direction of a film at a wavelength of 550 nm, $(R_{450})_{C_2}$ represents a phase difference value of C plate $C_2$ in a thickness direction of a film at a wavelength of 450 nm, and $(R_{550})_{C_2}$ represents a phase difference value of C plate $C_2$ in a thickness direction of a film at a wavelength of 550 nm.

Figure 11:
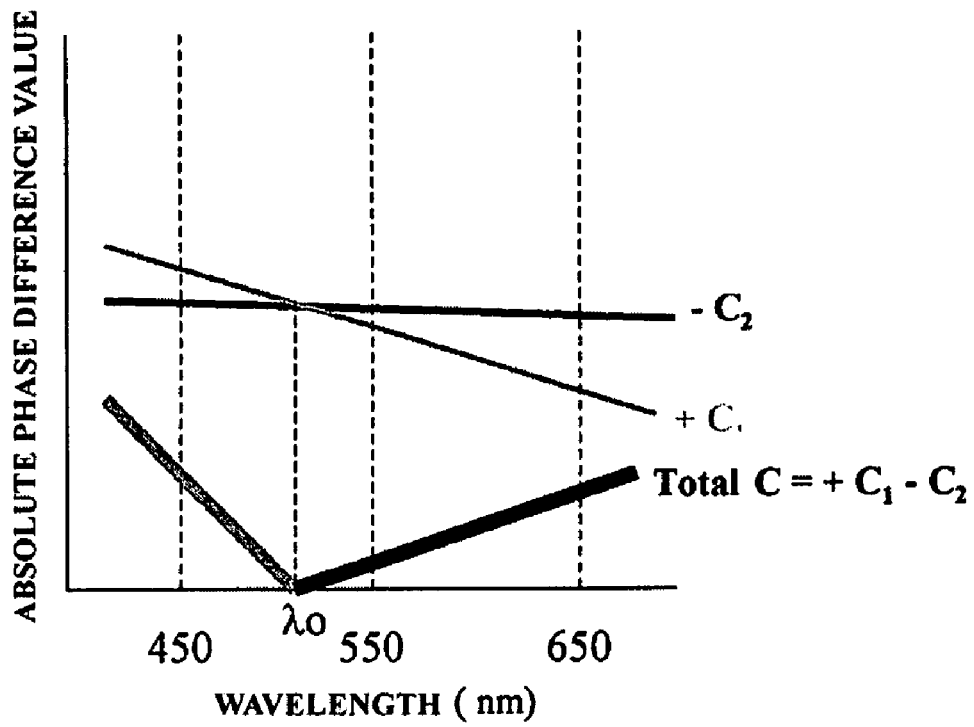
FIG. 11 is a view showing a mixed wavelength dispersion characteristic of a complex C plate having a variable mark and consisting of a positive C plate and a negative C plate, wherein, if a wavelength having a phase difference value of zero is a reference wavelength, a negative C plate having an inverse wavelength dispersion characteristic belongs to an area having a wavelength longer than the reference wavelength and a positive C plate having a normal wavelength dispersion characteristic belongs to an area having a wavelength shorter than the reference wavelength.

FIG. 11 shows an absolute phase difference values of $C_1$, $C_2$ and the mixed light compensation C plate in the thickness direction as a function of wavelengths, respectively, in which the mixed light compensation C plate represents the mark inversion characteristic at a predetermined wavelength $\lambda_0$ in such a manner that the mixed light compensation C plate becomes a positive C plate at the wavelength shorter than a predetermined wavelength $\lambda_0$, and becomes a negative C plate at the wavelength longer than the predetermined wavelength $\lambda_0$.

According to a ninth embodiment of the present invention, there is provided a mixed light compensation C plate representing a mark inversion characteristic at a predetermined wavelength, in which the mixed light compensation C plate becomes a negative C plate at a wavelength shorter than a predetermined wavelength $\lambda_0$, and becomes a positive C plate at a wavelength longer than the predetermined wavelength $\lambda_0$.

On the assumption that two films forming the mixed light compensation C plate having the mark inversion characteristic at a predetermined wavelength $\lambda_0$ are $C_1$ and $C_2$, in which $C_1$ is a negative C plate ($n_z<n_x=n_y$) and $C_2$ is a positive C plate ($n_z>n_x=n_y$), the mixed light compensation C plate having two films stacked on each other must satisfy the following equations in order to achieve the above wavelength dispersion characteristic.

$$|(R_{\lambda_0})_{C_1}|=(R_{\lambda_0})_{C_2}$$

[If only one wavelength in visible light range satisfies the above equation, $450<\lambda_0<650$ can be achieved.]

$$\frac{(R_{450})_{C_1}}{(R_{550})_{C_1}} > \frac{(R_{450})_{C_2}}{(R_{550})_{C_2}}$$

wherein, $(R_{450})_{C_1}$ represents a phase difference value of C plate $C_1$ in a thickness direction of a film at a wavelength of 450 nm, $(R_{550})_{C_1}$ represents a phase difference value of C plate $C_1$ in a thickness direction of a film at a wavelength of 550 nm, $(R_{450})_{C_2}$ represents a phase difference value of C plate $C_2$ in a thickness direction of a film at a wavelength of 450 nm, and $(R_{550})_{C_2}$ represents a phase difference value of C plate $C_2$ in a thickness direction of a film at a wavelength of 550 nm.

Figure 12:
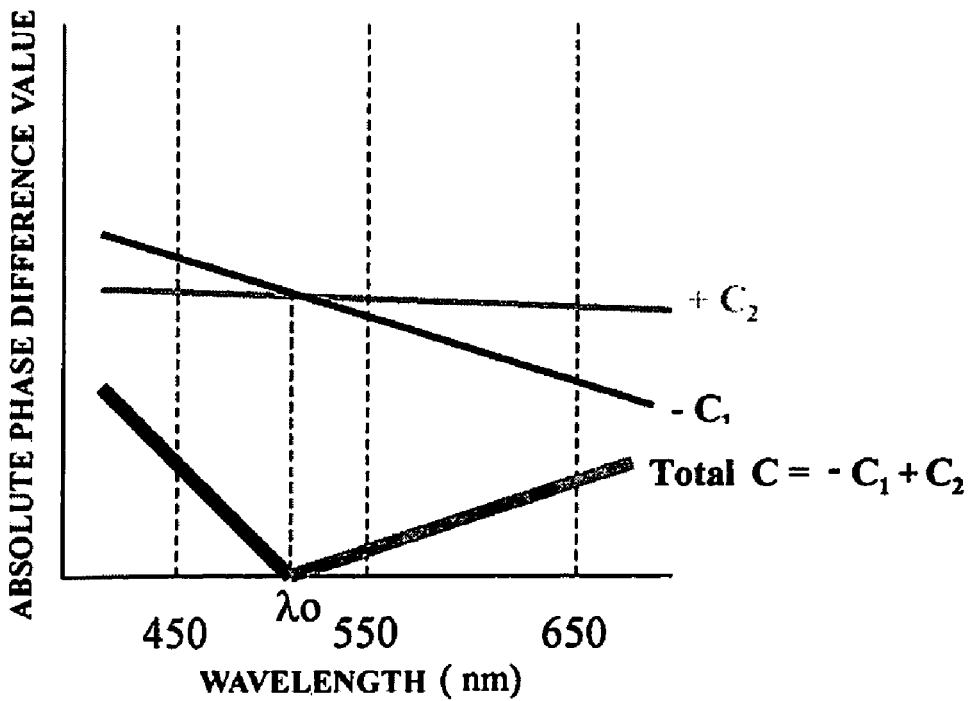
FIG. 12 is a view showing a mixed wavelength dispersion characteristic of a C plate having a complex variable mark and consisting of a negative C plate and a positive C plate, wherein, if a wavelength having a phase difference value of zero is a reference wavelength, a negative C plate having a normal wavelength dispersion characteristic belongs to an area having a wavelength shorter than the reference wavelength and a positive C plate having an inverse wavelength dispersion characteristic belongs to an area having a wavelength longer than the reference wavelength.

FIG. 12 shows an absolute phase difference values of $C_1$, $C_2$ and the mixed light compensation C plate in the thickness direction as a function of wavelengths, respectively, in which the mixed light compensation C plate represents the mark inversion characteristic at a predetermined wavelength $\lambda_0$ in such a manner that the mixed light compensation C plate becomes a negative C plate at the wavelength shorter than a predetermined wavelength $\lambda_0$, and becomes a positive C plate at the wavelength longer than the predetermined wavelength $\lambda_0$.

Two C plates, that is, the C plates $C_1$ and $C_2$ which are described in the present invention can be fabricated by using a plurality of division layers, respectively.

According to the complex light compensation C plate of the present invention including the C plates representing different dispersion ratio values, it is possible to achieve a complex C plate having a broadband wavelength dispersion characteristic even if the complex light compensation C plate is fabricated by using three C plates or more than three C plates.

Figure 13:
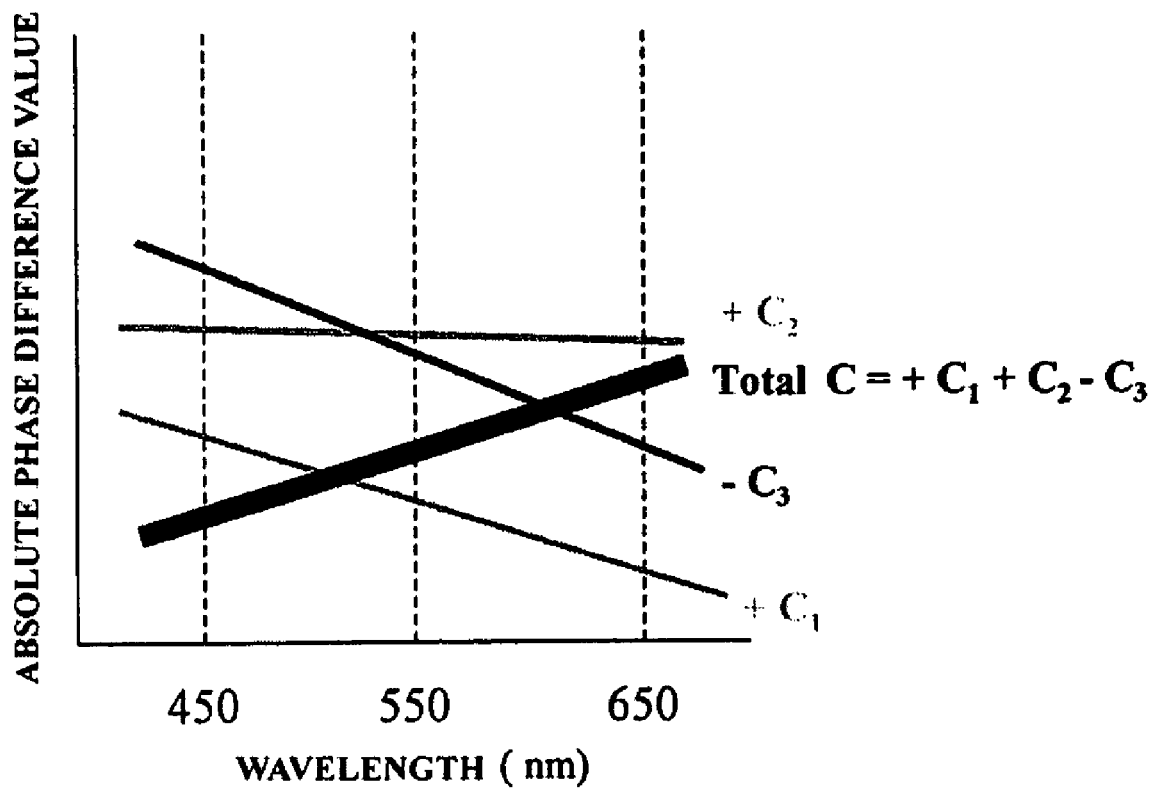
FIG. 13 is a view showing an inverse wavelength dispersion characteristic of a complex C plate consisting of two positive C plates and one negative C plate.

For example, FIG. 13 shows an absolute phase difference value of a complex C plate in the thickness direction thereof as a function of wavelengths, in which the complex C plate has an inverse wavelength dispersion characteristic by consisting of two positive C plates and one negative C plate. In this case, three C plates represent different wavelength dispersion characteristics, respectively.

Meanwhile, a stacking order of the C plates is not important in the present invention.

INDUSTRIAL APPLICABILITY

As can be seen from the foregoing, the compensation film made from the complex C plate according to the present invention can improve a contrast characteristic of a liquid crystal display device at various viewing angles and has a broadband wavelength dispersion characteristic capable of minimizing color variation in a black state of an LCD depending on various viewing angles.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A complex light compensation C plate comprising: at least two C plates ($n_z \neq n_x = n_y$) representing different dispersion ratio values, $$\left(\frac{R_{450}}{R_{550}}\right)$$

respectively, wherein
R=$(n_{x-ny})\times d$ represents a phase difference value in a thickness direction,
$n_x$ and $n_y$ are surface refractive indexes of a film,
$n_x$ is a refractive index in a thickness direction of a film,
d is a thickness of a film,
$R_{450}$ is a phase difference value of a C plate at a wavelength of 450 nm, and
$R_{550}$ is a phase difference value of a C plate at a wavelength of 550 nm.

2. The complex light compensation C plate according to claim 1, wherein the complex light compensation C plate consists of an m-number of positive C plates ($n_z>n_x=n_y$) and an n-number of negative C plates ($n_z<n_x=n_y$), and dispersion ratio values $$\left(\frac{R_{450}}{R_{550}}\right)$$

of at least two C plates are different from each other, wherein m=0 or a positive integer, n=0 or a positive integer, m+n≧2; $R=(n_{z-ny}) \times d$ representing a phase difference value in a thickness direction, $n_x$ and $n_y$ are surface refractive indexes of a film, $n_z$ is a refractive index in a thickness direction of a film, d is a thickness of a film; and $R_{450}$ is a phase difference value of a C plate at a wavelength of 450 nm, and $R_{550}$ is a phase difference value of a C plate at a wavelength of 550 nm.

3. The complex light compensation C plate according to claim 1, wherein the complex light compensation C plate includes a first C plate $C_1$ ($n_z \neq n_{x=ny}$) and a second C plate $C_2$ ($n_z \neq n_x = n_y$), and satisfies a following wavelength dispersion characteristic:

$$\frac{(R_{450})_{C_1}}{(R_{550})_{C_1}} \neq \frac{(R_{450})_{C_2}}{(R_{550})_{C_2}}$$

wherein, $R=(n_z-n_y) \times d$ representing a phase difference value in a thickness direction, $(R_{450})_{C_1}$ represents a phase difference value of the first C plate $C_1$ at a wavelength of 450 nm, $(R_{550})_{C_1}$ represents a phase difference value of the first C plate $C_1$ at a wavelength of 550 nm, $(R_{450})_{C_2}$ represents a phase difference value of the second C plate $C_2$ at a wavelength of 450 nm, $(R_{550})_{C_2}$ represents a phase difference value of the second C plate $C_2$ at a wavelength of 550 nm, $n_x$ and $n_y$ are surface refractive indexes of a film, $n_z$ is a refractive index in a thickness direction of a film, and d is a thickness of a film.

4. The complex light compensation C plate according to claim 1, wherein the complex light compensation C plate is a complex light compensation positive C plate having a positive C plate $C_1$ ($n_z > n_x = n_y$) and a negative C plate $C_2$ ($n_z < n_x = n_y$), and satisfies a following wavelength dispersion characteristic:

$$(R_{550})_{C_1} > |(R_{550})_{C_2}|$$
$$\frac{(R_{450})_{C_1}}{(R_{550})_{C_1}} > \frac{(R_{450})_{C_2}}{(R_{550})_{C_2}}$$

wherein, $R=(n_z-n_y) \times d$ representing a phase difference value in a thickness direction, $(R_{450})_{C_1}$ represents a phase difference value of the C plate $C_1$ at a wavelength of 450 nm, $(R_{550})_{C_1}$ represents a phase difference value of the C plate $C_1$ at a wavelength of 550 nm, $(R_{450})_{C_2}$ represents a phase difference value of the C plate $C_2$ at a wavelength of 450 nm, $(R_{550})_{C_2}$ represents a phase difference value of the C plate $C_2$ at a wavelength of 550 nm, $n_x$ and $n_y$ are surface refractive indexes of a film, $n_z$ is a refractive index in a thickness direction of a film, and d is a thickness of a film.

5. The complex light compensation C plate according to claim 1, wherein the complex light compensation C plate is a complex light compensation negative C plate having a negative C plate $C_1$ ($n_z < n_x = n_y$) and a positive C plate $C_2$ ($n_z > n_x = n_y$), and satisfies a following wavelength dispersion characteristic:

$$|(R_{550})_{C_1}| > (R_{550})_{C_2}$$
$$\frac{(R_{450})_{C_1}}{(R_{550})_{C_1}} > \frac{(R_{450})_{C_2}}{(R_{550})_{C_2}}$$

wherein, $R=(n_z-n_y) \times d$ representing a phase difference value in a thickness direction, $(R_{450})_{C_1}$ represents a phase difference value of the C plate $C_1$ at a wavelength of 450 nm, $(R_{550})_{C_1}$ represents a phase difference value of the C plate $C_1$ at a wavelength of 550 nm, $(R_{450})_{C_2}$ represents a phase difference value of the C plate $C_2$ at a wavelength of 450 nm, $(R_{550})_{C_2}$ represents a phase difference value of the C plate $C_2$ at a wavelength of 550 nm, $n_x$ and $n_y$ are surface refractive indexes of a film, $n_z$ is a refractive index in a thickness direction of a film, and d is a thickness of a film.

6. The complex light compensation C plate according to claim 1, wherein the complex light compensation C plate is a complex light compensation positive C plate having a positive C plate $C_1$ ($n_z > n_x = n_y$) and a negative C plate $C_2$ ($n_z < n_x = n_y$), and satisfies a following wavelength dispersion characteristic:

$$(R_{550})_{C_1} > |(R_{550})_{C_2}|$$
$$\frac{(R_{450})_{C_1}}{(R_{550})_{C_1}} < \frac{(R_{450})_{C_2}}{(R_{550})_{C_2}}$$

wherein, $R=(n_z-n_y) \times d$ representing a phase difference value in a thickness direction, $(R_{450})_{C_1}$ represents a phase difference value of the C plate $C_1$ at a wavelength of 450 nm, $(R_{550})_{C_1}$ represents a phase difference value of the C plate $C_1$ at a wavelength of 550 nm, $(R_{450})_{C_2}$ represents a phase difference value of the C plate $C_2$ at a wavelength of 450 nm, $(R_{550})_{C_2}$ represents a phase difference value of the C plate $C_2$ at a wavelength of 550 nm, $n_x$ and $n_y$ are surface refractive indexes of a film, $n_z$ is a refractive index in a thickness direction of a film, and d is a thickness of a film.

7. The complex light compensation C plate according to claim 1, wherein the complex light compensation C plate is a complex light compensation negative C plate having a negative C plate $C_1$ ($n_z < n_x = n_y$) and a positive C plate $C_2$ ($n_z > n_x = n_y$), and satisfies a following wavelength dispersion characteristic:

$$|(R_{550})_{C_1}| > (R_{550})_{C_2}$$
$$\frac{(R_{450})_{C_1}}{(R_{550})_{C_1}} < \frac{(R_{450})_{C_2}}{(R_{550})_{C_2}}$$

wherein, $R=(n_z-n_y) \times d$ representing a phase difference value in a thickness direction, $(R_{450})_{C_1}$ represents a phase difference value of the C plate $C_1$ at a wavelength of 450 nm, $(R_{550})_{C_1}$ represents a phase difference value of the C plate $C_1$ at a wavelength of 550 nm, $(R_{450})_{C_2}$ represents a phase difference value of the C plate $C_2$ at a wavelength of 450 nm, $(R_{550})_{C_2}$ represents a phase difference value of the C plate $C_2$ at a wavelength of 550 nm, $n_x$ and $n_y$ are surface refractive indexes of a film, $n_z$ is a refractive index in a thickness direction of a film, and d is a thickness of a film.

8. The complex light compensation C plate according to claim 1, wherein the complex light compensation C plate is a complex light compensation positive C plate having a first positive C plate $C_1$ ($n_z > n_x = n_y$) and a second positive C plate $C_2$ ($n_z > n_x = n_y$), said $C_1$ and $C_2$ representing different dispersion ratio values.

9. The complex light compensation C plate according to claim 1, wherein the complex light compensation C plate is a complex light compensation negative C plate having a first negative C plate $C_1$ ($n_z < n_x = n_y$) and a second negative C plate $C_2$ ($n_z < n_x = n_y$), and a second positive C plate $C_2$ ($n_z > n_x = n_y$), said $C_1$ and $C_2$ representing different dispersion ratio values.

10. The complex light compensation C plate according to claim 1, wherein the complex light compensation C plate represents a mark inversion characteristic for a phase difference value at a predetermined wavelength $\lambda_0$, has a positive C plate $C_1$ ($n_z > n_x = n_y$) and a negative C plate $C_2$ ($n_z < n_x = n_y$), and satisfies a following wavelength dispersion characteristic:

$$(R_{\lambda_0})_{C_1} = \left|(R_{\lambda_0})_{C_2}\right|$$

$$\frac{(R_{450})_{C_1}}{(R_{550})_{C_1}} > \frac{(R_{450})_{C_2}}{(R_{550})_{C_2}}$$

wherein, $R=(n_z-n_y) \times d$ representing a phase difference value in a thickness direction, $(R_{\lambda_0})_{C_1}$ is a phase difference value of the positive C plate $C_1$ in a thickness direction at the wavelength of $\lambda_0$, $(R_{\lambda_0})_{C_2}$ is a phase difference value of the negative C plate $C_2$ in a thickness direction at the wavelength of $\lambda_0$, $(R_{450})_{C_1}$ represents a phase difference value of the C plate $C_1$ at a wavelength of 450 nm, $(R_{550})_{C_1}$ represents a phase difference value of the C plate $C_1$ at a wavelength of 550 nm, $(R_{450})_{C_2}$ represents a phase difference value of the C plate $C_2$ at a wavelength of 450 nm, $(R_{550})_{C_2}$ represents a phase difference value of the C plate $C_2$ at a wavelength of 550 nm, $n_x$ and $n_y$ are surface refractive indexes of a film, $n_z$ is a refractive index in a thickness direction of a film, and d is a thickness of a film.

11. The complex light compensation C plate according to claim 1, wherein the complex light compensation C plate represents a mark inversion characteristic for a phase difference value at a predetermined wavelength $\lambda_0$, has a negative C plate $C_1$ ($n_z < n_x = n_y$) and a positive C plate $C_2$ ($n_z > n_x = n_y$), and satisfies a following wavelength dispersion characteristic:

$$\left|(R_{\lambda_0})_{C_1}\right| = (R_{\lambda_0})_{C_2}$$

$$\frac{(R_{450})_{C_1}}{(R_{550})_{C_1}} > \frac{(R_{450})_{C_2}}{(R_{550})_{C_2}}$$

wherein, $R=(n_z-n_y) \times d$ representing a phase difference value in a thickness direction, $(R_{80_0})_{C_1}$ is a phase difference value of the negative C plate $C_1$ in a thickness direction at the wavelength of $\lambda_0$, $(R_{\lambda_0})_{C_2}$ is a phase difference value of the positive C plate $C_2$ in a thickness direction thereof at the wavelength of $\lambda_0$, $(R_{450})_{C_1}$ represents a phase difference value of the C plate $C_1$ at a wavelength of 450 nm, $(R_{550})_{C_1}$ represents a phase difference value of the C plate $C_1$ at a wavelength of 550 nm, $(R_{450})_{C_2}$ represents a phase difference value of the C plate $C_2$ at a wavelength of 450 nm, $(R_{550})_{C_2}$ represents a phase difference value of the C plate $C_2$ at a wavelength of 550 nm, $n_x$ and $n_y$ are surface refractive indexes of a film, $n_z$ is a refractive index in a thickness direction of a film, and d is a thickness of a film.

12. The complex light compensation C plate according to any one of claims 1 to 11, wherein the C plates $C_1$ and $C_2$ are formed by a plurality of division layers, respectively.

13. The complex light compensation C plate according to claim 1, wherein the complex light compensation C plate has three C plates including a first positive C plate $C_1$ ($n_z > n_x = n_y$), a second negative C plate $C_2$ ($n_z < n_x = n_y$), and a third positive C plate ($n_z > n_x = n_y$) or a third negative C plate ($n_z < n_x = n_y$).

14. A liquid crystal display device comprising the complex light compensation C plate described in claim 1.

* * * * *